United States Patent
Hassanshahi et al.

(10) Patent No.: US 10,318,257 B2
(45) Date of Patent: Jun. 11, 2019

(54) SELECTIVE OBJECT SENSITIVE POINTS-TO ANALYSIS

(71) Applicant: Oracle International Corporation, Redwood Shores, CA (US)

(72) Inventors: Behnaz Hassanshahi, Brisbane (AU); Raghavendra Kagalavadi Ramesh, Brisbane (AU); Padmanabhan Krishnan, Brisbane (AU); Bernhard F. Scholz, Sydney (AU); Yi Lu, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 211 days.

(21) Appl. No.: 15/161,178

(22) Filed: May 20, 2016

(65) Prior Publication Data
US 2017/0337118 A1  Nov. 23, 2017

(51) Int. Cl.
*G06F 8/41*      (2018.01)
*G06F 11/36*    (2006.01)

(52) U.S. Cl.
CPC ............ *G06F 8/41* (2013.01); *G06F 8/434* (2013.01); *G06F 8/443* (2013.01); *G06F 8/4434* (2013.01); *G06F 11/3668* (2013.01)

(58) Field of Classification Search
None
See application file for complete search history.

(56) References Cited

U.S. PATENT DOCUMENTS

| | | | | |
|---|---|---|---|---|
| 2011/0173594 A1* | 7/2011 | Bartolomeo | ........ | G06F 11/3604 717/141 |
| 2011/0265182 A1* | 10/2011 | Peinado | ................ | G06F 21/554 726/24 |

OTHER PUBLICATIONS

Chris Lattner, "Making context-sensitive points-to analysis with heap cloning practical for the real world", Jun. 2007, ACM (Year: 2007).*
Martim Carbone, "Mapping Kernel Objects to Enable systematic Integrity Checking", Nov. 2009, ACM. (Year: 2009).*
Nicholas Allen et al., "Combining Type-Analysis with Points-To Analysis for Analyzing Java Library Source-Code" Jun. 14, 2015 (6 pages).

(Continued)

*Primary Examiner* — Duy Khuong T Nguyen
*Assistant Examiner* — Mark A Gooray
(74) *Attorney, Agent, or Firm* — Ferguson Braswell Fraser Kubasta PC

(57) ABSTRACT

A method for points-to program analysis includes extracting a kernel from a program, performing a fixed object sensitive points to analysis of the kernel to obtain fixed analysis results, and assigning, for a first candidate object in the kernel, a first context depth to the first candidate object. The candidate objects are identified using the fixed analysis results. The method further includes assigning, for a second candidate object, a second context depth to the second candidate object. The second context depth is different than the first context depth. The method further includes performing, to obtain selective analysis results, a selective object sensitive points to analysis using the first context depth for the first candidate object and the second context depth for the second candidate object, and performing an action based on the selective analysis results.

20 Claims, 8 Drawing Sheets

(56) References Cited

OTHER PUBLICATIONS

Yannis Smaragdakis et al., "Pick Your Contexts Well: Understanding Object-Sensitivity" Jan. 26, 2011 (13 pages).
Ana Milanova et al., "Parameterized Object Sensitivity for Points-to Analysis for Java" Jan. 2005 (41 pages).
Vineeth Kashyap et al., "JSAI: A Static Analysis Platform for JavaScript" Nov. 16, 2014 (12 pages).
John Whaley et al., "Cloning-Based Context-Sensitive Pointer Alias Analysis Using Binary Decision Diagrams" Jun. 9, 2004 (14 pages).
Stephen M Blackburn et al., "The DaCapo Benchmarks: Java Benchmarking Development and Analysis" Oct. 22, 2006 (22 pages).
Xin Zhang et al., "On Abstraction Refinement for Program Analyses in Datalog" Jun. 9, 2014 (10 pages).
Martin Bravenboer et al., "Strictly Declarative Specification of Sophisticated Points-to Analyses" Oct. 25, 2009 (19 pages).
Chris Lattner et al., "Making Context-sensitive Points-to Analysis with Heap Cloning Practical for the Real World" Jun. 11, 2007 (12 pages).
Manu Sridharan et al., "Refinement-Based Context-Sensitive Points-To Analysis for Java" Jun. 10, 2006 (14 pages).
Yannis Smaragdakis et al., "Introspective Analysis: Context-Sensitivity, Across the Board" Jun. 9, 2014 (11 pages).
Percy Liang et al., "Scaling Abstraction Refinement via Pruning" Jun. 4, 2011 (12 pages).
Samuel Z. Guyer et al., "Client-Driven Pointer Analysis" Jun. 11, 2003 (21 pages).

* cited by examiner

```
                                            ┌─ 600
                                           ╱
            public class Container{            public class C2 {
602 ──▶ o₁: arr = new Object[10];              public void m2(Object a2) {
        int index=0;                    606 ──▶ o₃: C1 c = new ...;
        public void put(Object x){          c.m1(d2);
          arr[index++] = x;                  }
        }                                  }
        public Object get(int i){
          ret = arr[i];                    public class C3 {
          return ret;                        public void m3(){
        }                               608 ──▶ o₄: C2 a = new C2();
        }                               610 ──▶ o₅: Object x1 = new ...;
                                            a.m2(x1);
        public class C1{                612 ──▶ o₆: C2 b = new C2();
          public void m1(Object a1){    614 ──▶ o₇: Object x2 = new ...;
604 ──▶   o₂: Container c = new ...;        b.m2(x2);
          c.put(a);                        }
          y = c.get(1);                  }
        }                                o₈: C3 a = new C3();
        }                                    c.m3();
```

| 2O+2H | 3O+3H | Selective |
|---|---|---|
| $([o_3,o_2],o_1) \leftarrow ([o_3,o_2],\text{arr})$ | $([o_4,o_3,o_2],o_1) \leftarrow ([o_4,o_3,o_2],\text{arr})$ | $([o_4,o_3,o_2],o_1) \leftarrow ([o_4,o_3,o_2],\text{arr})$ |
| | $([o_6,o_3,o_2],o_1) \leftarrow ([o_6,o_3,o_2],\text{arr})$ | $([o_6,o_3,o_2],o_1) \leftarrow ([o_6,o_3,o_2],\text{arr})$ |
| $([o_4,o_3],o_2) \leftarrow ([o_4,o_3],c)$ | $([o_4,o_3,o_2]) \leftarrow ([o_8,o_4,o_3],c)$ | $([o_4,o_3,o_2]) \leftarrow ([o_8,o_4,o_3],c)$ |
| $([o_6,o_3],o_2) \leftarrow ([o_6,o_3],c)$ | $([o_6,o_3,o_2]) \leftarrow ([o_8,o_6,o_3],c)$ | $([o_6,o_3,o_2]) \leftarrow ([o_8,o_6,o_3],c)$ |
| $([-,o_8],o_5) \leftarrow ([o_3,o_2],X)$ | $([-,o_8],o_5) \leftarrow ([o_4,o_3,o_2],X)$ | $([o_8],o_5) \leftarrow ([o_4,o_3,o_2],X)$ |
| $([-,o_8],o_7) \leftarrow ([o_3,o_2],X)$ | $([-,o_8],o_7) \leftarrow ([o_6,o_3,o_2],X)$ | $([o_8],o_7) \leftarrow ([o_6,o_3,o_2],X)$ |
| $([-,o_8],o_5) \leftarrow ([o_3,o_2],\text{ret})$ | $([-,o_8],o_5) \leftarrow ([o_4,o_3,o_2],\text{ret})$ | $([o_8],o_5) \leftarrow ([o_4,o_3,o_2],\text{ret})$ |
| $([-,o_8],o_7) \leftarrow ([o_3,o_2],\text{ret})$ | $([-,o_8],o_7) \leftarrow ([o_6,o_3,o_2],\text{ret})$ | $([o_8],o_7) \leftarrow ([o_6,o_3,o_2],\text{ret})$ |
| $([-,o_8],o_7) \leftarrow ([-,o_6,o_3],y)$ | $([-,o_8],o_5) \leftarrow ([-,o_4,o_3],y)$ | $([o_8],o_5) \leftarrow ([-,o_4,o_3],y)$ |
| $([-,o_8],o_5) \leftarrow ([o_6,o_3],y)$ | $([-,o_8],o_7) \leftarrow ([-,o_4,o_3],y)$ | $([o_8],o_7) \leftarrow ([-,o_4,o_3],y)$ |
| $([-,o_8],o_7) \leftarrow ([o_4,o_3],y)$ | | |
| $([-,o_8],o_7) \leftarrow ([o_6,o_3],y)$ | | |

620  622  624

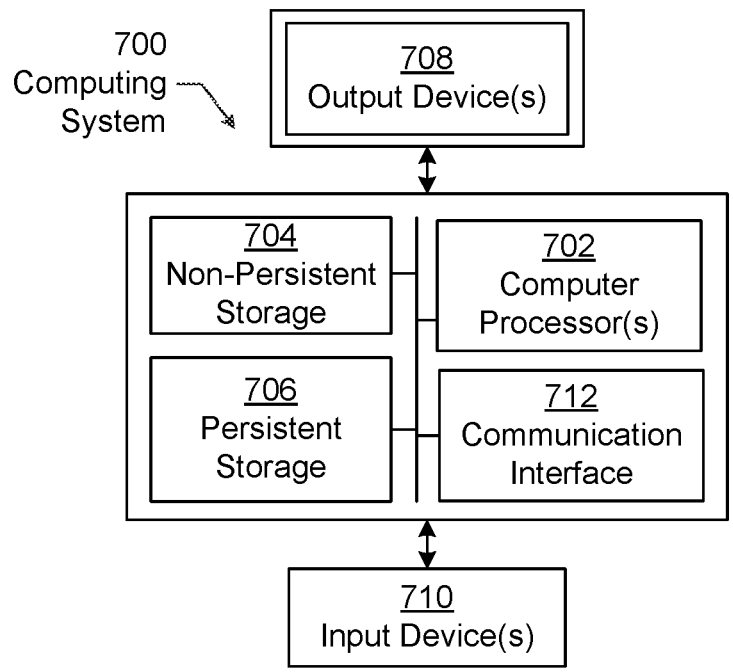
*FIG. 7.1*
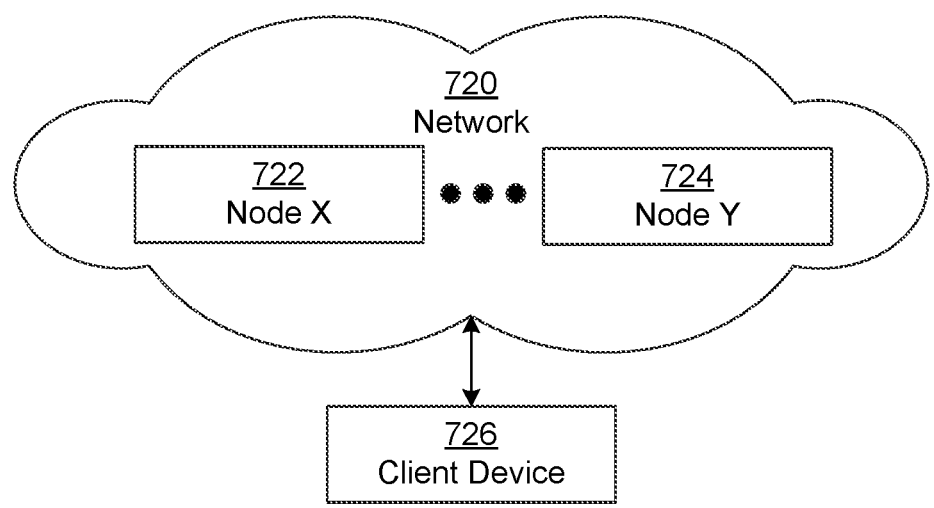
*FIG. 7.2*

SELECTIVE OBJECT SENSITIVE POINTS-TO ANALYSIS

BACKGROUND

Computer systems function through the execution of programs on computer processors. During execution, various faults (e.g., bugs, vulnerabilities, etc.) may occur. In order to mitigate the faults, program analysis is performed. One type of program analysis used for object oriented language is a points to analysis. A points to analysis is a code analysis technique that determines which objects may point to which variables.

SUMMARY

In general, in one aspect, one or more embodiments relate to a method for points-to program analysis. The method includes extracting a kernel from a program, performing a fixed object sensitive points to analysis of the kernel to obtain fixed analysis results, and assigning, for a first candidate object in the kernel, a first context depth to the first candidate object. The candidate objects are identified using the fixed analysis results. The method further includes assigning, for a second candidate object, a second context depth to the second candidate object. The second context depth is different than the first context depth. The method further includes performing, to obtain selective analysis results, a selective object sensitive points to analysis using the first context depth for the first candidate object and the second context depth for the second candidate object, and performing an action based on the selective analysis results.

In general, in one aspect, one or more embodiments relate to a system for points-to program analysis. The system includes a data repository for storing a program, a computer processor, and memory for storing instructions, which, when executed on the computer processor to perform the following. The instructions extract a kernel from a program, perform a fixed object sensitive points to analysis of the kernel to obtain fixed analysis results, and assign, for a first candidate object in the kernel, a first context depth to the first candidate object. The candidate objects are identified using the fixed analysis results. The instructions further assign, for a second candidate object, a second context depth to the second candidate object. The second context depth is different than the first context depth. The instructions further perform, to obtain selective analysis results, a selective object sensitive points to analysis using the first context depth for the first candidate object and the second context depth for the second candidate object, and perform an action based on the selective analysis results.

In general, in one aspect, one or more embodiments relate to a non-transitory computer readable medium for points-to program analysis, the non-transitory computer readable medium including computer readable program code that perform the following. The computer readable program code extract a kernel from a program, perform a fixed object sensitive points to analysis of the kernel to obtain fixed analysis results, and assign, for a first candidate object in the kernel, a first context depth to the first candidate object. The candidate objects are identified using the fixed analysis results. The computer readable program code further assign, for a second candidate object, a second context depth to the second candidate object. The second context depth is different than the first context depth. The computer readable program code further perform, to obtain selective analysis results, a selective object sensitive points to analysis using the first context depth for the first candidate object and the second context depth for the second candidate object, and perform an action based on the selective analysis results.

Other aspects of the invention will be apparent from the following description and the appended claims.

BRIEF DESCRIPTION OF DRAWINGS

FIGS. 6.1 and 6.2 shows an example in accordance with one or more embodiments of the invention.

FIGS. 7.1 and 7.2 show a computing system in accordance with one or more embodiments of the invention.

DETAILED DESCRIPTION

Figure 1:
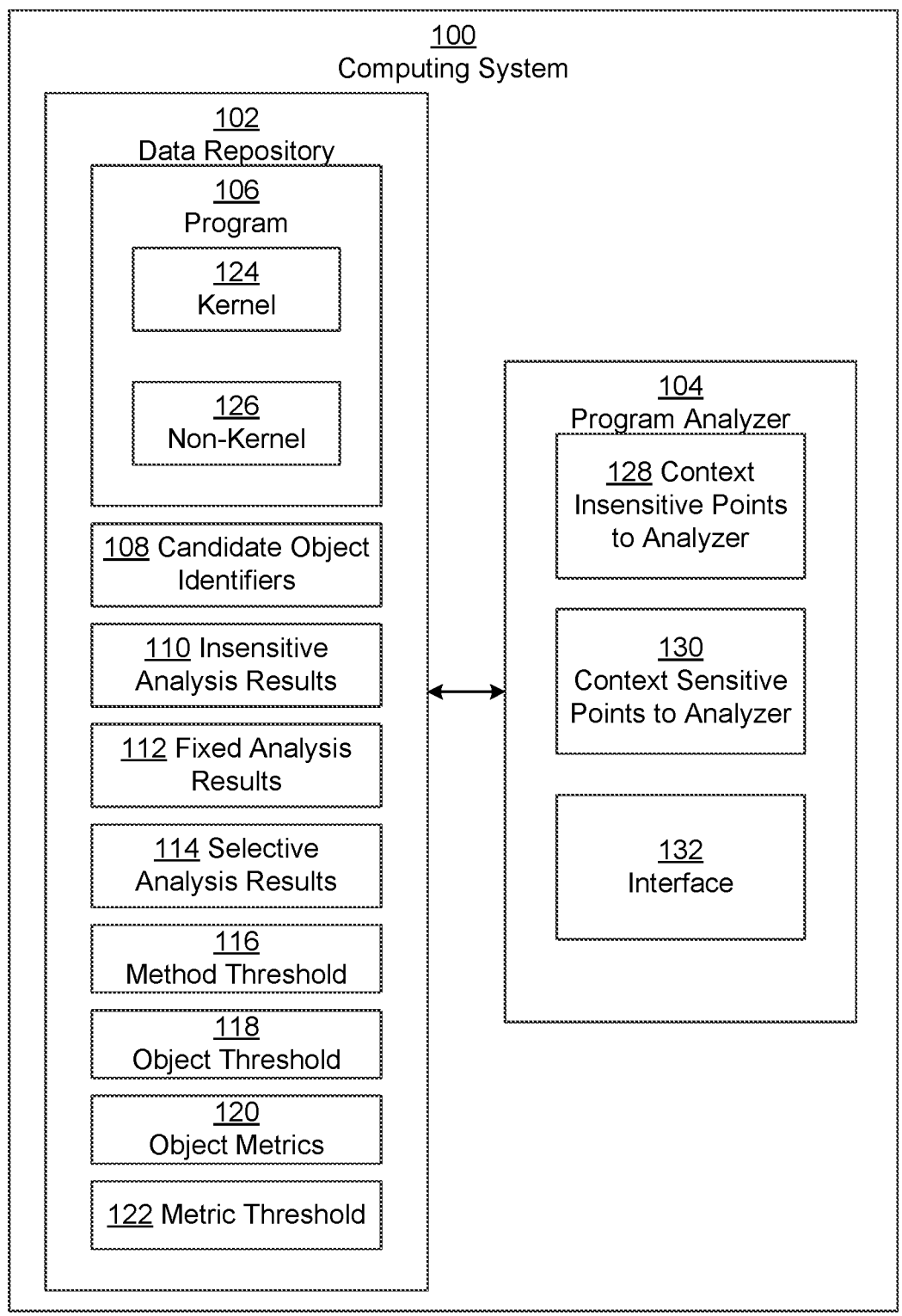
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a dynamic object sensitive points-to analysis. In particular, the depth at which the points to analysis is performed is dependent on the heap allocation site and may vary for different heap allocation sites in the program. By performing a dynamic object sensitive points-to analysis, one or more embodiments may render the points to analysis more scalable and accurate.

FIG. 1 shows a schematic diagram of a computing system (100) in accordance with one or more embodiments of the invention. The computing system (100) in FIG. 1 may correspond to the computing system shown in FIGS. 7.1 and 7.2. As shown in FIG. 1, the computing system (100) includes a data repository (102) and a program analyzer (104) in accordance with one or more embodiments of the invention.

In one or more embodiments of the invention, the data repository (102) is any type of storage unit and/or device (e.g., physical memory, heap, a file system, database, collection of tables, or any other storage mechanism) for storing data. Further, the data repository (102) may include multiple different storage units and/or devices. The multiple different storage units and/or devices may or may not be of the same type or located at the same physical site. In one or more embodiments of the invention, the data repository (102) includes functionality to store, temporarily or permanently, in whole or in part, program (106), candidate object identifiers (108), insensitive analysis results (110), fixed analysis results (112), selective analysis results (114), method threshold (116), object threshold (118), object metrics (120), and metric threshold (122). Each of these are described below.

A program (106) is a set of instructions written in an object oriented programming language. In other words, the program uses objects, whereby each object has data (e.g., fields or attributes), and methods that perform operations on the data. When a program (106) is executed, the object may be stored in a heap data structure. The heap allocation site is the portion of the heap in which an object is created. Multiple instances of a type of object may exist. Each instance is an individual object.

In one or more embodiments of the invention, the program (106) is a complete software application. In one or more embodiments of the invention, the program (106) is a software library. The program (106) may be in source code, object code, or another form of the code. The program (106) includes a kernel (124) and a non-kernel (126). In one or more embodiments of the invention, the kernel (124) and the non-kernel (126) are non-empty portions of the program. The non-kernel (126) is any part of the program that is not part of the kernel (124). The kernel (124) is the part of the program that is the crux of the program (106). In other words, objects in the kernel have a threshold degree of connectivity with other objects that may or may not be in the kernel (124). The connectivity is with respect to pointer references. Because of the connectivity, a context sensitive points to analysis may be useful to reduce a number of pointer references considered by using the context of the objects. The objects of the non-kernel (126) do not have the threshold degree of connectivity. Thus, while some reduction of references may occur in at least some embodiments, the reduction may be insignificant when considering the additional time. In one or more embodiments of the invention, the program does not include an explicit identifier of the kernel. Rather, the portion of the program (106) that forms the kernel (124) may be identified by applying a connectivity analysis to the program.

Continuing with FIG. 1, the candidate object identifiers (108) are identifiers of candidate objects. In particular, each candidate object is assigned a unique identifier that is unique for the object at least with respect to the analysis of the program (106). A candidate object is an object in the kernel that may benefit from a context sensitive points to analysis.

Insensitive analysis results (110) are results from performed are results of performing a points to analysis on the program (106). For example, the insensitive analysis results may describe the points to relationship between objects, without considering the context of the objects. In one or more embodiments of the invention, the insensitive analysis results (110) includes maps that map variables to objects and fields of objects to objects. In one or more embodiments of the invention, variables and objects are associated with each other in the insensitive analysis results (110) when a points to relationship exists between the variables and objects.

Fixed analysis results (112) are results of performing a context sensitive points to analysis at a fixed level of object sensitivity. The fixed level is consistent for each object in which the object sensitive points to analysis is being performed. The fixed level of object sensitivity considers the context of the object at a defined number of method invocations and object creations. The form of the fixed analysis results may be similar to the insensitive analysis results. In other words, the fixed analysis results may be the insensitive analysis results with at least some of the spurious tuples removed.

Selective analysis results (114) are results of performing a context sensitive points to analysis at various levels of object sensitivity for different objects. In other words, during a single points to analysis, different objects may have different depths of context that are considered for the objects. One or more embodiments use a selective points to analysis to have different levels of context sensitivity for different objects. In one or more embodiments of the invention, the form of the selective analysis results may be similar to the insensitive analysis results. In other words, the selective analysis results may be the insensitive analysis results or the fixed analysis results with at least some of the spurious tuples removed.

Method threshold (116) is a threshold that is used to identify the kernel (124) in accordance with one or more embodiments of the invention. The method threshold (116) is the threshold number of variables pointed to by an object by which the class of the object is considered to be part of the kernel (124). In one or more embodiments of the invention, the method threshold (116) may be a dynamic threshold. In particular, the method threshold may be dependent on timing to perform a context sensitive analysis on a particular program. Thus, for example, a larger method threshold may be used for larger, more complex programs to decrease the size of the kernel (124).

The object threshold (118) is a threshold that is used to identify the kernel (124) in accordance with one or more embodiments of the invention. The object threshold is the threshold number of objects pointed to by variables of a method of a class that is part of the kernel. In one or more embodiments of the invention, the object threshold (118) may be a dynamic threshold. Like the method threshold (116), the object threshold (118) may be dependent on timing to perform a context sensitive analysis on a particular program. A larger object threshold (118) may be used for larger, more complex programs to decrease the size of the kernel (124).

Object metrics (120) are measurements about an object. The object metrics provide an indication as to the level in which the context of the object may remove spurious tuples. In one or more embodiments, the object metric may include an inflow metric, an outflow metric, and a context value metric. The inflow metric of an object is a measure of the heap context that are related to the heap objects stored in a field of the object. In other words, inflow considers the possible heap objects from different heap contexts that may be stored in other objects in different object contexts based on a storage instruction. Outflow metric is a measure of the heap contexts related to heap objects that are loaded from a field of an object qualified with an object context of a variable for which the load is performed. In other words, outflow is the result of a load operation on a variable. Context value is an estimation of the effectiveness of the context for an object. In other words, context value estimates how well considering the context of the object distinguishes between possible points to possibilities. Thus, if the object context does not narrow the number of tuples, then performing a context sensitive analysis may be costly in terms of time without provide sufficient gain in precision.

In the present application, object context is the context of an object as defined by method invocations. More formally, object context may be described as follows. An instance method m which is a potential target of an invocation is distinguished with respect to an ordered sequence of objects of the form $(o_1, o_2, \ldots, o_{n1})$ where $o_{n1}$ is the base object of the invocation of m, and $o_i$ is the object creating $o_{i+1}$. Heap context is the context of an object as defined by new object creation. Heap context may be defined as follows. A heap object o is distinguished with respect to an ordered sequence of objects of the form $(o_1, o_2, \ldots, o_{n2}))$ where $o_{n2}$ is the object creating o, $o_j$ is the object creating $o_{j+1}$.

The metric threshold (122) is a threshold defining when to use the object context in the points to analysis. In one or more embodiments of the invention, the metric threshold is a threshold for the context value.

Continuing with the computing system (100), the program analyzer (104) is hardware, software, or any combination thereof that includes functionality to performed a points to analysis on a program. The program analyzer (104) may be or may be a part of a security application, a compiler, a performance tester, an integrated development environment, another program, or a combination thereof. For example, a security application may be used to test the program (106) for possible vulnerabilities, such as incorrect object references that may result in the program (106) referencing an external object or information from a user referencing secure data. The compiler may perform a points to analysis to compile the program and create object code from the source code. Performance tester may be used to determine where possible memory leaks and other degradations of performance exist in the program. In one or more embodiments of the invention, by using the dynamic object context sensitive points to analysis, the program analyzer (104) may provide more accurate results, while at the same time complying with performance requirements to process the program. The accuracy may be used to reduce security vulnerabilities, generate a more optimized program when compiled, and identify possible performance bottlenecks. Thus, large programs may be analyzed and execute more efficiently than otherwise.

The program analyzer (104) includes a context insensitive points to analyzer (128), a context sensitive points to analyzer (130), and an interface. The context insensitive points to analyzer (128) includes functionality to perform a points to analysis that does not consider context. The context insensitive points to analyzer may include functionality to generate insensitive analysis results in accordance with one or more embodiments of the invention. The context sensitive points to analyzer (130) includes functionality to perform a context sensitive points to analysis. In particular, the context sensitive points to analyzer (130) includes functionality to perform a fixed context sensitive points to analysis and generate fixed analysis results (112), and to perform a selective context sensitive points to analysis and generate selective analysis results (114). The interface (132) is a set of instructions by which the program analyzer (104) may receive instructions and present results. For example, the interface (132) may include an application programming interface (API) and/or a user interface. The application programming interface may include functionality to receive parameters (e.g., program identifier of the program (106), and configurations) from another application, and send results to another application. The user interface may include widgets that include functionality to receive parameters, and display results. Other interface components may exist and may be used without departing from the scope of the invention.

While FIG. 1 shows a configuration of components, other configurations may be used without departing from the scope of the invention. For example, various components may be combined to create a single component. As another example, the functionality performed by a single component may be performed by two or more components.

FIGS. 2, 3, 4, and 5 show flowcharts in accordance with one or more embodiments of the invention. The steps of the flowcharts may be performed by the system described above with reference to FIG. 1. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 201, a kernel is extracted from the program in accordance with one or more embodiments of the invention. Extracting the kernel includes identifying the portion of the program corresponding to the kernel and storing an identifier of the kernel. For example, the identifier may be the class names of classes in the kernel. In one or more embodiments of the invention, the program may be stored in a storage location accessible by the program analyzer. The program analyzer may receive a request to analyze the program. For example, the request may be from a user or another program. In response, the program analyzer analyzes the program to identify which parts of the program correspond to the kernel. In general, the identification of the kernel is based on the connectivity of the objects as identified in an insensitive points to analysis. Extracting the kernel in accordance with some embodiments is discussed in additional detail in FIG. 3 below. Other techniques for extracting the kernel may be used without departing from the scope of the invention.

Figure 2:
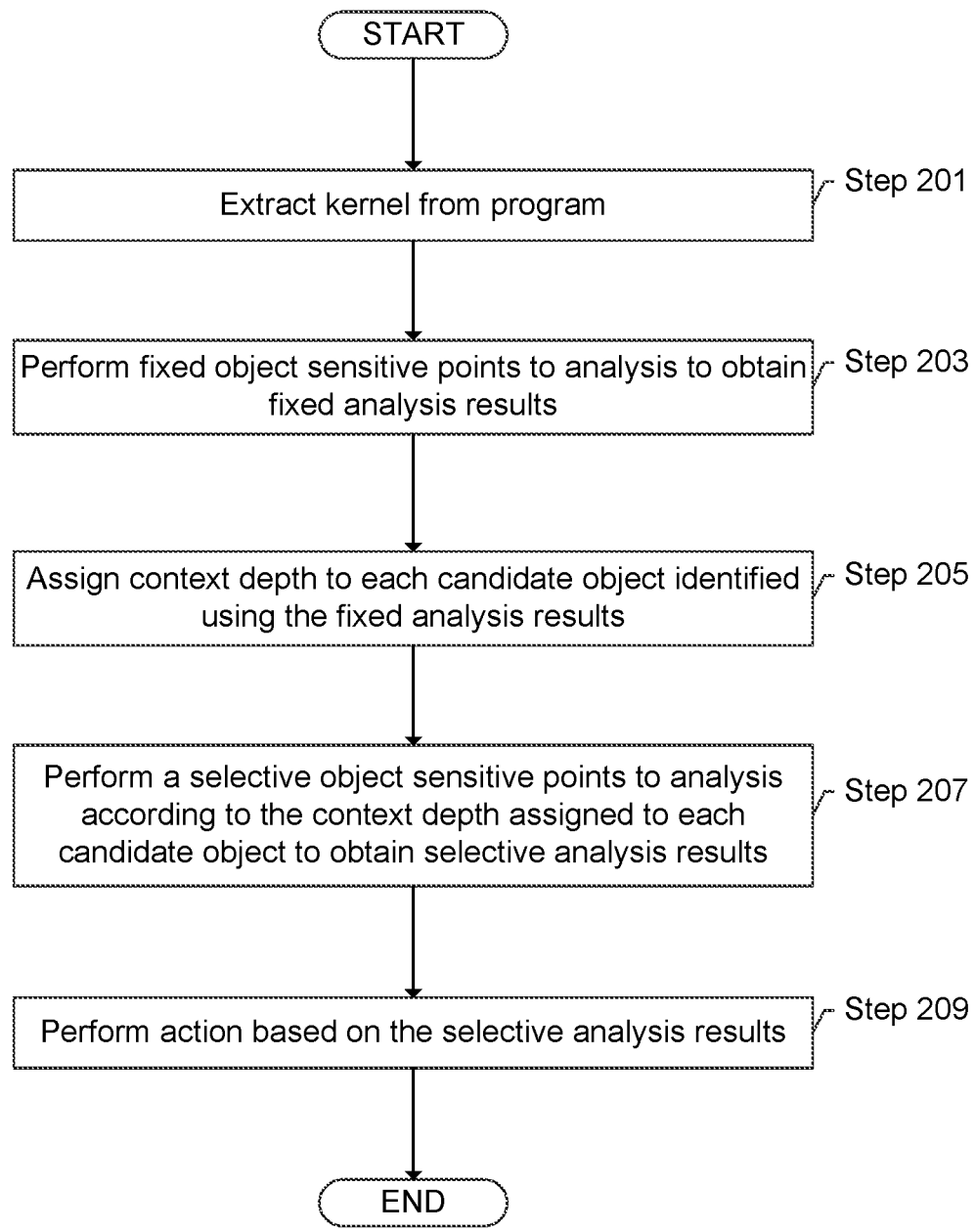
FIGS. 2, 3, 4, and 5 show flowcharts in accordance with one or more embodiments of the invention.

Continuing with FIG. 2, in Step 203, a fixed object sensitive points to analysis is performed on the kernel to obtain fixed analysis results. In one or more embodiments of the invention, any fixed object sensitive points to analysis may be performed. Although the fixed object sensitive analysis may be temporally expensive, because the analysis is applied only to the kernel, fewer objects and contexts of objects are analyzed than in the program. Thus, a larger program may be analyzed. The results of the fixed object sensitive points to analysis are fixed analysis results.

In Step 205, a context depth is assigned to candidate objects in the fixed analysis results. In one or more embodiments of the invention, based on the fixed object sensitive points to analysis, candidate objects may be identified. Metrics for the candidate objects may be determined. Based on the metrics, a determination may be made as to degree to which considering a particular context distinguishes between different results sets. If the degree is sufficient (e.g., is estimated to reduce the result set by a threshold amount), the context depth is set to the identified degree. By way of a simple example, consider the scenario in which object O1 may point to objects O2, O3, and O4. Further, in the example, in object context c1, O1 may point to only objects O2 and O3 while, in object context c2, O1 may point only to objects O3 and O4. In such a scenario, the context may be deemed to distinguish sufficiently to result sets by reducing the result set by one. Now, consider a furtherance of the example in which in object context c3, O1 may point to O2, O3, and O4. In such a scenario, object context c3 does not distinguish between result sets. Thus, a context insensitive analysis may be performed.

In one or more embodiments of the invention, the determination of the context depth is performed at least on a per object basis. Thus, different candidate objects may have different context depth assigned to the candidate objects. Further, the available context depths to assign may be more than two depths. The assignment may be performed by relating in a data structure, an identifier of the candidate object with the identifier of the context depth.

Assigning the context depth in accordance with some embodiments is discussed in additional detail in FIG. 5 below. Other techniques for determining the may be used without departing from the scope of the invention.

In Step 207, a selective object sensitive points to analysis is performed in accordance with one or more embodiments of the invention. In one or more embodiments of the invention, the selective object sensitive points to analysis is performed on the whole input program. The analysis applies a fixed object sensitivity to objects not in the kernel. The depth of the fixed object sensitivity may be a configurable parameters, set by default, or otherwise defined. For objects in the kernel, the context depth as assigned in Step 205 is applied. Thus, different objects in the kernel may be analyzed with different contexts. In one or more embodiments of the invention, rather than or in addition to performing a fixed object sensitive points to analysis on objects not in the kernel, a context insensitive analysis may be performed. Further, rather than repeating the analysis on parts of the kernel already analyzed at the defined object sensitivity, prior results may be used in some embodiments.

In Step 209, an action is performed based on the selective analysis results in accordance with one or more embodiments of the invention. For example, the action may be to optimize the program, compile the program, display an alert (e.g., on at least one display device to the user, to a community about a security vulnerability, or other group), display a status of the results, modify the program, remove the program, execute the program, or another action or a combination thereof.

Figure 3:
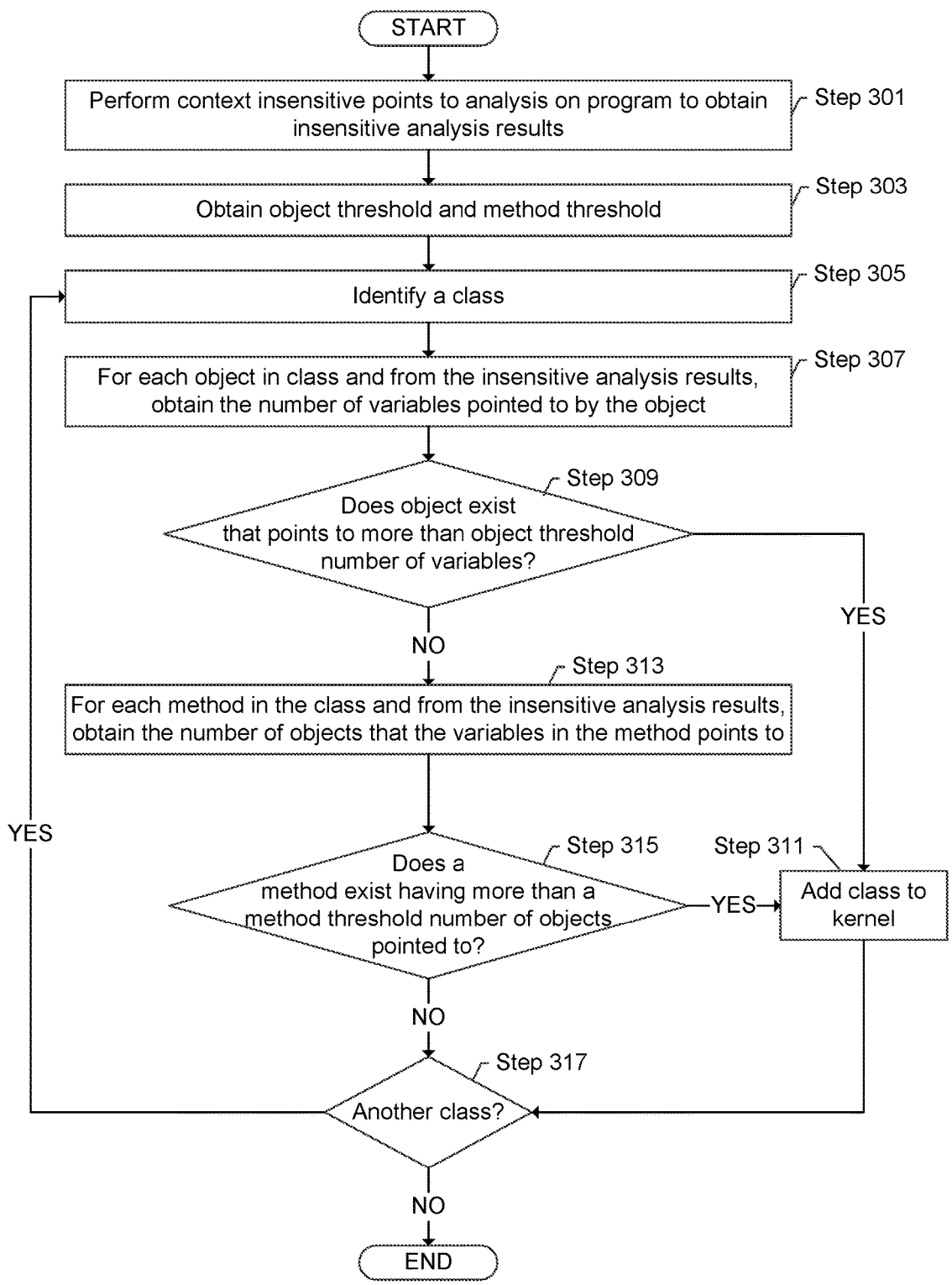

FIG. 3 shows a flowchart for extracting the kernel in accordance with one or more embodiments of the invention. In Step 301, a context insensitive points to analysis is performed on the program to obtain insensitive analysis results in accordance with one or more embodiments of the invention. The context insensitive analysis does not consider the heap context or object context of objects in the program. Techniques known in the art for performing context insensitive points to analysis may be performed on the whole program.

In Step 303, an object threshold and a method threshold are obtained in accordance with one or more embodiments of the invention. In some embodiments, either or both the object threshold and method threshold are dynamic thresholds that are generated based on the program. In such a scenario, obtaining the object threshold and the method threshold is performed by generating the respective thresholds. A technique for generating the object threshold and method threshold is discussed below with reference to FIG. 4. In one or more embodiments of the invention, static thresholds may be used. For example, static method thresholds and/or object thresholds may be set by a user, another program, or predefined in the program analyzer. In such embodiments, obtaining the object threshold and method threshold may be from memory.

Continuing with FIG. 3, in Step 305, a class is identified in accordance with one or more embodiments of the invention. In particular, one or more embodiments may process each class individually, serially and/or in parallel. Further, the classes may be processed in virtually any order.

In Step 307, for each object in the class and from the insensitive analysis results, the number of variables pointed to by the object is obtained. In one or more embodiments, each object is associated with a metric that defines the number of variables pointed to by the object. Determining the number of variables pointed to by an object may be performed directly from a points to map in the insensitive analysis results.

In Step 309, a determination is made whether an object exists that points to more than an object threshold number of variables in accordance with one or more embodiments of the invention. As discussed above, the object threshold is a number. Thus, Step 309 may be performed by comparing the numbers identified in Step 307 with the object threshold. If at least one number identified in Step 307 is greater than the object threshold, then Step 309 is satisfied and the flow proceeds to Step 311 in accordance with one or more embodiments of the invention. In other words, at least one object of the class has more than a threshold number of variables pointed to by the object. In Step 311, the class is added to the kernel. In other words, the class may be deemed to be a part of the kernel and an identifier of the class is related to the kernel.

Returning to Step 309, the flow may proceed to Step 313. In Step 313, for each method in the class and from the insensitive analysis results, the number of objects that the variables in the method points to is obtained. In one or more embodiments, the system processes individually each method in the class to associate a number with the method. The number is a sum across the variables in the method of the number of objects pointed to by a variable in the method in accordance with one or more embodiments of the invention. Determining the total number for a method may be from the points to map in the insensitive analysis results. Other techniques for determining the number may be used without departing from the scope of the invention.

In Step 315, a determination is made whether a method exists having more than a method threshold number of objects pointed to by the variables in the method. In one or more embodiments of the invention, the determination in Step 315 is made whether any number determined for the class in Step 313 is greater than the number for the method threshold. If a method exists satisfying the condition for Step 315, then the flow may proceed to Step 311 to add the class to the kernel. Otherwise, the flow may proceed to Step 317, to determine whether another unprocessed class exists. If another unprocessed class exists, the flow may proceed to Step 305 to process the unprocessed class.

Although FIG. 3 shows two conditions, one of which needs to be satisfied to be added to the kernel, both conditions and/or other conditions may need to be satisfied to add the class to the kernel.

Figure 4:
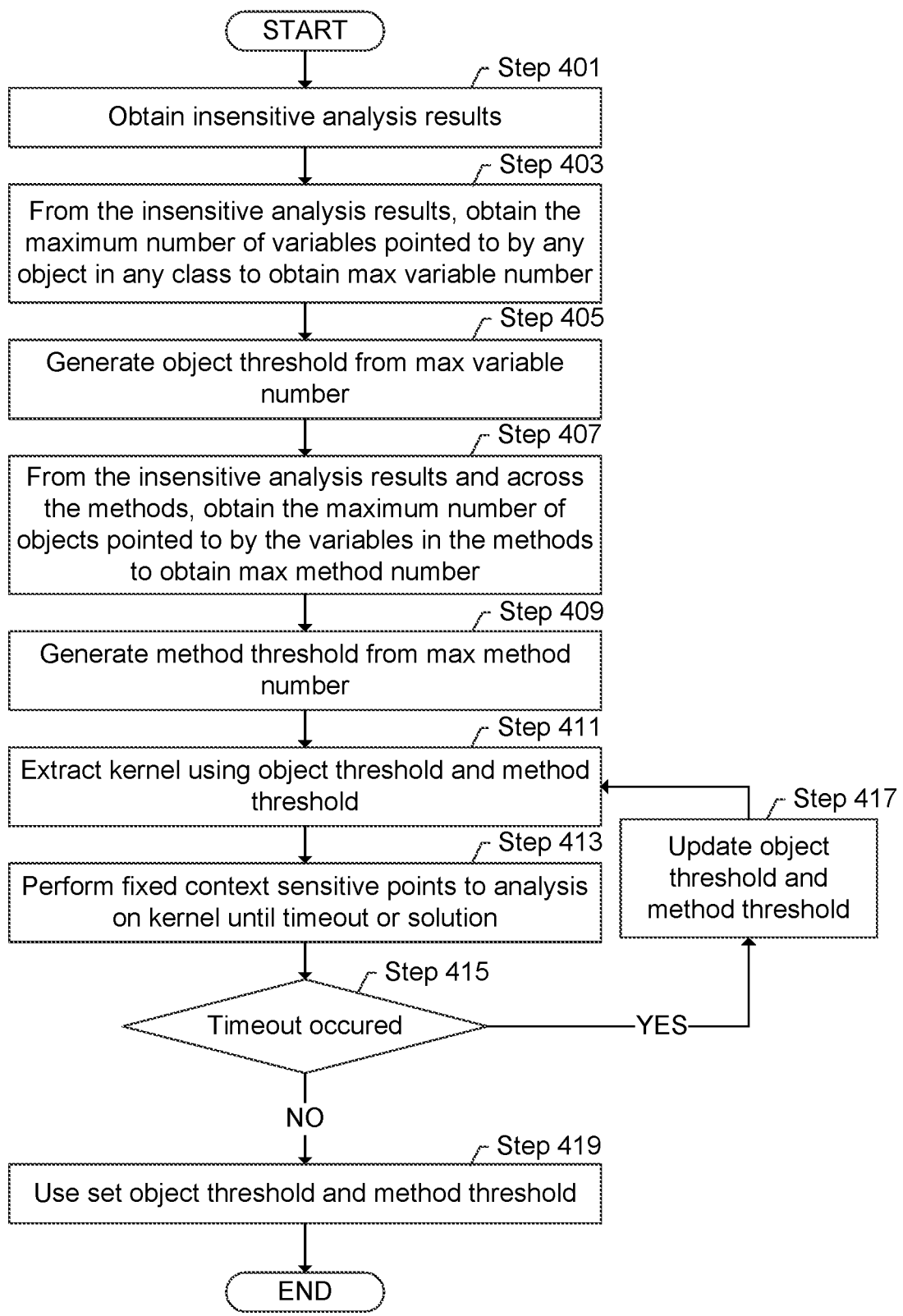

FIG. 4 shows a flowchart for generating an object threshold and method threshold in accordance with one or more embodiments of the invention. In Step 401, insensitive analysis results are obtained in accordance with one or more embodiments of the invention. The insensitive analysis results may be obtained, for example, from memory if the insensitive analysis is previously performed. By way of another example, obtaining the insensitive analysis results may be performed by performing a context insensitive analysis on the program.

In Step 403, from the insensitive analysis results, the maximum number of variables pointed to by any object in any class is obtained to obtain a max variable number. Performing Step 403 may be perform similar to Step 307, but for all classes to obtain a number for each object that represents the number of variables pointed to by the object. A maximum of the number across the methods and classes is obtained as the max variable number.

In Step 405, the object threshold is generated from the max variable number in accordance with one or more embodiments of the invention. The max variable number represents a maximum connectivity across the methods. The object threshold is a reduction of the max variable number, so that the kernel may include more than one class. In general, the closer that the object threshold is to the max variable number, the smaller the kernel may be. By way of an example, the object threshold may be initially set based on a function of the max variable number, such as half of the max variable number. Other functions of the max variable number may be used without departing from the scope of the invention.

In Step 407, from the insensitive analysis results and across the methods, the maximum number of objects pointed to by the variables in the methods to obtain max method number is obtained. Step 407 may be performed in a similar manner to Step 403, but for the method threshold. In other words, for each method of each class, the total number of objects pointed to by variables in the method are identified from the insensitive analysis results. The maximum number across the methods and classes is identified and set as the max method number.

In Step 409, the method threshold is generated from the max method number. Similar to the object threshold, the max method number represents a maximum connectivity across the methods. The method threshold is a reduction of the max method number, so that the kernel may include more than one class. In general, the closer that the method threshold is to the max method number, the smaller the kernel may be. By way of an example, the method threshold may be initially set based on a function of the max method number, such as half of the max method number. Other functions of the max method number may be used without departing from the scope of the invention.

In Step 411, the kernel is extracted using the object threshold and the method threshold in accordance with one or more embodiments of the invention. For example, the Steps 305-317 of FIG. may be performed to extract the kernel using the provided object threshold and method threshold.

In Step 413, a fixed context sensitive points to analysis is performed on the kernel until a timeout or a solution is obtained. Performing the fixed object sensitive points to analysis may be the same as described above with reference to Step 203 of FIG. 2. During the fixed object sensitive points to analysis, a timer may be used to determine whether the system times out. In particular, in Step 415, a determination is made whether a timeout occurs. If a timeout occurs, then the size of the kernel may be deemed to be too large. In such a scenario, Step 417 may be performed to reduce the size of the kernel. In one or more embodiments of the invention, the object threshold and the method threshold are increased. Increasing the object threshold and the method threshold may be performed by applying a defined respective function to each of the object threshold and the method threshold. For example, the function may be new object threshold=mean (old object threshold, max variable number), and new method threshold=mean (old method threshold, max method number). Other functions may be used without departing from the scope of the invention. After updating the thresholds, the flow may return to Step 411 to extract the new kernel and perform the fixed context sensitive analysis.

Returning to Step 415, if a timeout did not occur, the flow may proceed to Step 419 to use the set object threshold and the method threshold in accordance with one or more embodiments of the invention. In particular, the kernel extracted from the set object threshold and method threshold may be used in accordance with one or more embodiments of the invention.

In the above flowcharts, the Steps described above may be combined. For example, the fixed object sensitive points to analysis described in Step 203 may be the same performance of the fixed object sensitive points to analysis described in Step 413 once a solution in the form of fixed analysis results are obtained. Multiple fixed object sensitive points to analysis may be performed, whereby several analysis do not achieve a solution, but rather timeout. By way of another example, FIGS. 3 and 4 may be combined such that the kernel is extracted once using the thresholds of FIG. 4. For example, Step 411 may be performed by issuing a procedure call to a procedure defined in FIG. 3, and Step 303 may be performed by obtaining the values of the arguments in the procedure call. Thus, in the example, although the flowcharts may show certain steps as being performed multiple times, the steps may be combined to be performed a single time without departing from the scope of the invention.

Figure 5:
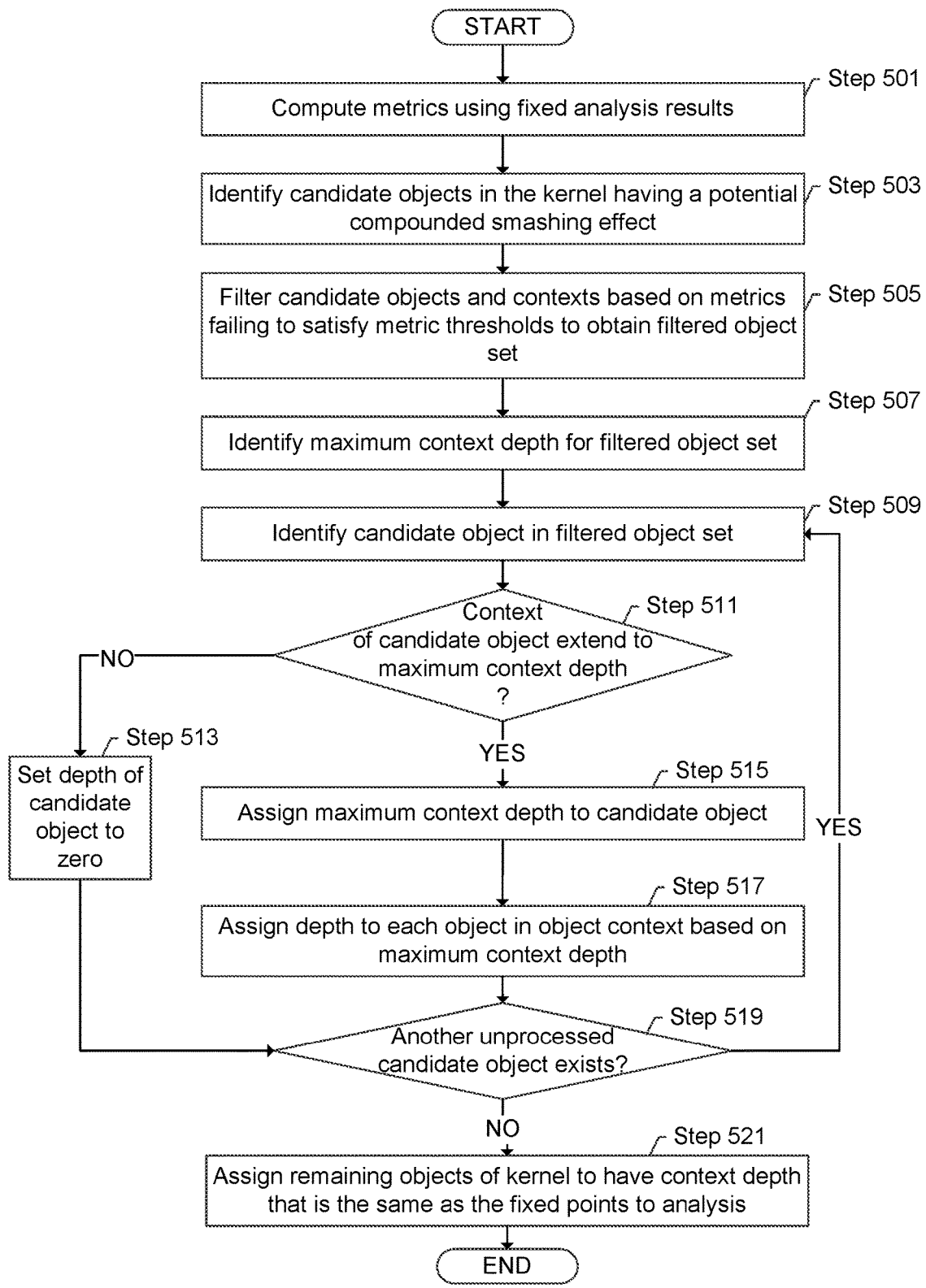

FIG. 5 shows a flowchart for assigning context depth to candidate objects of the kernel in accordance with one or more embodiments of the invention. In Step 501, metrics using the fixed object sensitive points to analysis results are computed in accordance with one or more embodiments of the invention. In one or more embodiments of the invention, the inflow metric, outflow metric, and context value metric are determined from the fixed analysis results.

Determining the inflow metric may be performed using the following equation Eq. 1:

$$\text{InFlow}(o) = \left\{ (h, hc, oc) \middle| \begin{array}{l} \text{Store}(b, *, v) \text{ for some variables } b, v \\ \text{PointsTo}(oc, o, c, b) \text{ and} \\ \text{PointsTo}(hc, h, c, v) \text{ for some context } c \end{array} \right\} \quad \text{(Eq. 1)}$$

In Eq. 1, h is heap, hc is heap context, oc is object context, c is a context, v is a variable and b is a variable. Thus, Eq. 1 specifies that a tuple having a heap h, heap context hc, and object context oc is in the inflow of object o if the following conditions are met for some variable b and v: (1) there is a store instruction that stores an object referenced by variable v into any field of variable b, (2) there is a points to relationship such that variable b under object context c points to object o when qualified with object context oc, and (3) there is a points to relationship such that variable v under object context c points to object h when qualified with heap context hc. The inflow metric may be calculated as the number of tuples that are in the inflow of o.

Similarly, the outflow metric may be performed using the following equation Eq. 2:

$$\text{OutFlow}(v, o, oc) = \left\{(c, h, hc) \middle| \begin{array}{l} \text{Load}(b, *, v) \text{ for some variables } b, v \\ \text{PointsTo}(oc, o, c, b) \text{ and} \\ \text{PointsTo}(hc, h, c, v) \text{ for some context } c \end{array}\right\} \quad \text{(Eq. 2)}$$

In Eq. 2, v is a variable, o is an object, and oc is an object context. Further, h is heap, hc is heap context, oc is object context, c is a context, and b is a variable. Eq. 2 gives a measure on the heap contexts related to the heap objects that are loaded from field f of the object o qualified with object context oc for variable v. Thus, Eq. 2 specifies that a tuple having a context c, heap h, heap context hc is in the outflow of the tuple having variable v, object o, and object context oc if the following conditions are met for some variable b and v: (1) there is a load instruction that loads an object referenced by variable v from any field of variable b, (2) there is a points to relationship such that variable b under object context c points to object o when qualified with object context oc, and (3) there is a points to relationship such that variable v under object context c points to object h when qualified with heap context hc. The outflow metric may be calculated as the number of tuples that are in the outflow of the tuple having variable v, object o, and object context oc.

Context value may use the inflow metric and the outflow metric using the following equation Eq. 3:

$$\text{ContextValue}(o, oc) = \min_v \frac{|\text{Inflow}(o)| \cdot |\text{CtxInOutFlow}(v, o, oc)|}{|\text{Outflow}(v, o, oc|} \quad \text{(Eq. 3)}$$

CtxInOutFlow in Equation Eq. 3 is described in the following equation Eq. 4:

$$\text{CtxInOutFlow}(v, o, oc) = \{c | (c, h, hc) \in \text{OutFlow}(v, o, oc) \text{ for some } h, hc\} \quad \text{(Eq. 4)}$$

In Eq. 3 and Eq. 4, o is an object, and oc is an object context. Further, h is heap, hc is heap context, oc is object context, c is a context, and b is a variable. Eq. 3 and Eq. 4 gives a measure on how well the object context oc distinguishes between results in the fixed context sensitive analysis. If the context value is one and the size of the inflow set for an object o is greater than 1, then the context oc does not distinguish between points to facts. However, if the context value metric is greater than one, then the object context oc does distinguish between points to facts.

In Step 503, candidate objects in the kernel having a potential compounded smashing effect are identified in accordance with one or more embodiments of the invention. Smashing effect occurs when an analysis does not distinguish properties of member elements in a group. For example, consider an array with ten elements exists and only one element has a particular property. If the analysis treats all ten elements of the array to have the particular property, then the analysis is deemed to have a smashing effect on arrays. Continuing with the discussion of the compounded smashing effect, context sensitivity may qualify each variable v and each object o with contexts. A tuple of the form (oc, o, c, v) means that v under context c, points to object o of context oc. For some objects, context sensitivity may not add value. For example, if the points-to results as (oc1, o, c, v), (oc2, o, c, v), (oc1, o', c, v), (oc2, o', c, v), the contexts oc1 and oc2 are not very useful. If points-to results is of the form (oc1, o, c, v), (oc2, o', c, v), then the contexts oc1 and oc2 are useful in giving the information that when v points to o and when v points to o'. When contexts are not useful, the contexts may be referred to as spurious or useless contexts. Smashing effect may increase the generation of useless contexts. In other words, if a context is not adding value in distinguishing groups, the context will not further distinguish the member elements and will be a burden to analyze each member element of a group. The influence of smashing effect in making the contexts more and more burdensome on group elements is compounded smashing effect. Determining whether an object has a compounded smashing effect may be performed based on a heuristic, such as selecting objects of an array type.

In Step 505, candidate objects and contexts that fail to satisfy metric thresholds are filtered to obtain a filtered object set in accordance with one or more embodiments of the invention. In other words, each candidate object that has a metric not satisfying a metric threshold is filtered and not considered for further analysis. In one or more embodiments, such objects are set to have a context depth of the fixed object sensitive points to analysis. The filtering may be performed to remove objects that have a context value that are less than a first metric threshold. The filtering may also remove object that have a size of an inflow set greater than a second metric threshold. Other filtering may be used without departing from the scope of the invention.

In Step 507, a maximum context depth for the filtered object set is identified in accordance with one or more embodiments of the invention. In one or more embodiments of the invention, the maximum context depth is the greatest depth to which the program may be analyzed. The greatest depth may be predefined as part of an input to the analysis, determined from the size of the program, or determined based on other attributes of the program.

In Step 509, a candidate object in the filtered object set identified in accordance with one or more embodiments of the invention. Candidate objects are processed individually in accordance with one or more embodiments of the invention. Further, in one or more embodiments, candidate objects may be processed in serial and/or in parallel.

In Step 511, a determination is made whether the context of the candidate object extends to the maximum context depth in accordance with one or more embodiments of the invention. In other words, a check is performed to determine whether extending the context depth for the candidate object to the maximum context depth adds value. In other words, a determination is made whether extending the context depth reduces the results, so as to sufficiently distinguish between results. If extending the context of the candidate object to the maximum context depth, then the depth of the candidate object is set to zero in Step 513. In other words, for the candidate object, no context sensitive analysis is performed.

If, in Step 511, the determination is made to extend the context depth of the candidate object to the maximum context depth, then the maximum context depth is assigned to the candidate object in Step 515. In other words, in a data structure, the candidate object is related to the maximum context depth. In Step 517, a depth is assigned to each object in the object context of the candidate object based on the maximum context depth in accordance with one or more embodiments of the invention. In other words, each object that is part of the context of the candidate object is assigned a context depth. In one or more embodiments of the invention, cascading context depths are assigned in order of the context. The object context may be defines as follows. An instance method m which is a potential target of an invocation is distinguished with respect to an ordered sequence of objects of the form $(o_1, o_2, \ldots, o_{n1})$, where $o_{n1}$ is the base object of the invocation of m, and $o_i$ is the object creating $o_{i+1}$.

Thus, by way of an example, consider the scenario in which the object context is oc, which is defined by oc= $(o_1, \ldots, o_h, \ldots, o_n)$. In the example, consider the scenario in which h is the minimum of n and k−n, whereby k is the maximum context depth minus one, and n is the context depth of the fixed context sensitive analysis. In the example, the object $o_1$ is assigned a context depth of k; object $o_2$ is assigned a context depth of k−1; object $o_3$ is assigned a context depth of k−2, etc. The depth of object $o_h$ is thus assigned a context depth of k−h+1. Accordingly, each object has a different context depth assigned to the object.

Continuing with FIG. 5, in Step 519, a determination is made whether another unprocessed candidate object exists. If another unprocessed candidate object exists, the flow returns to Step 509 to process the unprocessed candidate object. Any objects of the kernel remaining after processing are assigned to have a context depth which is the same as the fixed points to analysis. The assignment may be performed at any point in the processing. Rather than an explicit assignment, the default may be the same as the fixed points to analysis. In other words, when an object is not associated with a context depth, the selective context sensitive points to analysis may apply a default context depth that is the same as the fixed context depth of the fixed points to analysis. At the completion of the flow of FIG. 5, a set of pairs $<o_i, d_i>$ is created whereby $d_i$ is the context depth assigned to object $o_i$.

The following example is for explanatory purposes only and not intended to limit the scope of the invention. FIGS. 6.1 and 6.2 show an example in accordance with one or more embodiments of the invention. In particular, FIG. 6.1 shows a code sample (600). In the code sample (600), objects $o_1$ (602), $o_2$ (604), $o_3$ (606), $o_4$ (608), $o_5$ (610), $o_6$ (612), and $o_7$ (614) are created by the corresponding instructions. FIG. 6.2 shows an analysis of the example using one or more embodiments described herein. In particular, column 1 (620) shows a fixed context sensitive points to analysis at an object context depth of 2 and a heap context depth of 2, column 2 (622) shows a fixed context sensitive points to analysis at an object context depth of 3 and a heap context depth of 3, and column 3 (624) shows a selective context sensitive points to analysis. As shown in column 3 (624) as compared to column 2 (622), the contexts which do not add value are removed from the heap contexts, though we keep the object contexts fixed. By way of a more specific example, the heap contexts for the objects pointed to by variables—c, x, ret and y may be removed.

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for points-to program analysis, comprising:
extracting a kernel from a program;
performing, by at least one computer processor, a fixed object sensitive points to analysis of the kernel to obtain fixed analysis results;
assigning, by the at least one computer processor and for a first candidate object of a plurality of candidate objects in the kernel, a first context depth to the first candidate object, wherein the plurality of candidate objects are identified using the fixed analysis results;
assigning, by the at least one computer processor and for a second candidate object of the plurality of candidate objects, a second context depth to the second candidate object, wherein the second context depth is different than the first context depth;
performing, by the at least one computer processor and to obtain selective analysis results, a selective object sensitive points to analysis using the first context depth for the first candidate object and the second context depth for the second candidate object, wherein the selective analysis results comprises a first mapping of a first variable to the first candidate object and comprises a second mapping of a second variable to the second candidate object; and compiling the program using the selective analysis results.

2. The method of claim 1, wherein extracting the kernel comprises:

performing a context insensitive points to analysis on the program to obtain insensitive analysis results;

for each object in a class and from the insensitive analysis results, obtain a number of variables pointed to by the object; and adding the class to a candidate class when an object exists in the class having more than an object threshold number of variables.

3. The method of claim 2, wherein the object threshold is a dynamic threshold dependent on a maximum number of variables pointed to by any object in any class of the kernel, the maximum number determined based on the insensitive analysis results.

4. The method of claim 1, wherein extracting the kernel comprises:

performing a context insensitive points to analysis on the program to obtain insensitive analysis results;

for each method in a class and from the insensitive analysis results, obtain a number of objects pointed to by a variable in the method; and adding the class to a candidate class when a method exists in the class having more than a method threshold number of objects.

5. The method of claim 4, wherein the method threshold is a dynamic threshold dependent on a maximum number of objects pointed to by variables in a plurality of methods of the kernel, the maximum number determined based on the insensitive analysis results.

6. The method of claim 1, further comprising:

computing, using a fixed object sensitive points to analysis, a context sensitive metric defining whether an object context of the first object distinguishes between object sets in the fixed context sensitive points to analysis, wherein the first context depth is determined based on the context sensitive metric.

7. The method of claim 6, wherein the context sensitive metric is computed from an inflow metric for the object and an outflow metric for the object.

8. The method of claim 6, wherein the first context depth is an extended maximum context depth.

9. The method of claim 8, wherein the second context depth is a maximum context depth based on being in the object context of the first object.

10. A system for points-to program analysis, comprising:
a data repository for storing a program;
a computer processor;
memory for storing instructions, which, when execute on the computer processor:
extract a kernel from a program;
perform a fixed object sensitive points to analysis of the kernel to obtain fixed analysis results;
assign, for a first candidate object of a plurality of candidate objects in the kernel, a first context depth to the first candidate object, wherein the plurality of candidate objects are identified using the fixed analysis results;
assign, for a second candidate object of the plurality of candidate objects, a second context depth to the second candidate object, wherein the second context depth is different than the first context depth;
perform, to obtain selective analysis results, a selective object sensitive points to analysis using the first context depth for the first candidate object and the second context depth for the second candidate object, wherein the selective analysis results comprises a first mapping of a first variable to the first candidate object and comprises a second mapping of a second variable to the second candidate object; and
compile the program using the selective analysis results.

11. The system of claim 10, further comprising:
a display for displaying an error determined from the selective analysis results.

12. A non-transitory computer readable medium for points-to program analysis, the non-transitory computer readable medium comprising computer readable program code for:

extracting a kernel from a program;
performing a fixed object sensitive points to analysis of the kernel to obtain fixed analysis results;
assigning, for a first candidate object of a plurality of candidate objects in the kernel, a first context depth to the first candidate object, wherein the plurality of candidate objects are identified using the fixed analysis results;
assigning, for a second candidate object of the plurality of candidate objects, a second context depth to the second candidate object, wherein the second context depth is different than the first context depth;
performing, to obtain selective analysis results, a selective object sensitive points to analysis using the first context depth for the first candidate object and the second context depth for the second candidate object, wherein the selective analysis results comprises a first mapping of a first variable to the first candidate object and comprises a second mapping of a second variable to the second candidate object; and
compile the program using the selective analysis results.

13. The non-transitory computer readable medium of claim 12, wherein extracting the kernel comprises:
performing a context insensitive points to analysis on the program to obtain insensitive analysis results;
for each object in a class and from the insensitive analysis results, obtain a number of variables pointed to by the object; and
adding the class to a candidate class when an object exists in the class having more than an object threshold number of variables.

14. The non-transitory computer readable medium of claim 13, wherein the object threshold is a dynamic threshold dependent on a maximum number of variables pointed to by any object in any class of the kernel, the maximum number determined based on the insensitive analysis results.

15. The non-transitory computer readable medium of claim 12, wherein extracting the kernel comprises:
performing a context insensitive points to analysis on the program to obtain insensitive analysis results;
for each non-transitory computer readable medium in a class and from the insensitive analysis results, obtain a number of objects pointed to by a variable in the non-transitory computer readable medium; and
adding the class to a candidate class when a non-transitory computer readable medium exists in the class having more than a non-transitory computer readable medium threshold number of objects.

16. The non-transitory computer readable medium of claim 15, wherein the non-transitory computer readable medium threshold is a dynamic threshold dependent on a maximum number of objects pointed to by variables in a plurality of non-transitory computer readable mediums of the kernel, the maximum number determined based on the insensitive analysis results.

17. The non-transitory computer readable medium of claim 12, further comprising:
    computing, using a fixed object sensitive points to analysis, a context sensitive metric defining whether an object context of the first object distinguishes between object sets in the fixed context sensitive points to analysis,
    wherein the first context depth is determined based on the context sensitive metric.

18. The non-transitory computer readable medium of claim 17, wherein the context sensitive metric is computed from an inflow metric for the object and an outflow metric for the object.

19. The non-transitory computer readable medium of claim 17, wherein the first context depth is an extended maximum context depth.

20. The non-transitory computer readable medium of claim 19, wherein the second context depth is a maximum context depth based on being in the object context of the first object.

\* \* \* \* \*

UNITED STATES PATENT AND TRADEMARK OFFICE
CERTIFICATE OF CORRECTION

PATENT NO. : 10,318,257 B2
APPLICATION NO. : 15/161178
DATED : June 11, 2019
INVENTOR(S) : Hassanshahi et al.

Page 1 of 1

It is certified that error appears in the above-identified patent and that said Letters Patent is hereby corrected as shown below:

In the Specification

In Column 5, Line 6, delete "$o_{n2}))$" and insert -- $o_{n2})$ --, therefor.

In Column 11, Line 34, delete "oc|" and insert -- oc)| --, therefor.

Signed and Sealed this
Twenty-eighth Day of July, 2020

Andrei Iancu
*Director of the United States Patent and Trademark Office*